(12) United States Patent
Brigolin

(10) Patent No.: US 10,189,134 B2
(45) Date of Patent: Jan. 29, 2019

(54) INDEXABLE PLENUM

(71) Applicant: GM Global Technology Operations LLC, Detroit, MI (US)

(72) Inventor: David Brigolin, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 15/372,629

(22) Filed: Dec. 8, 2016

(65) Prior Publication Data
US 2018/0161948 A1    Jun. 14, 2018

(51) Int. Cl.
*B23Q 11/00* (2006.01)
*B23C 5/16* (2006.01)
*B23C 1/20* (2006.01)

(52) U.S. Cl.
CPC ........... *B23Q 11/0046* (2013.01); *B23C 5/16* (2013.01); *B23C 1/20* (2013.01); *B23C 2226/62* (2013.01); *B23C 2230/08* (2013.01); *Y10T 408/44* (2015.01); *Y10T 408/50* (2015.01); *Y10T 409/304088* (2015.01); *Y10T 409/306608* (2015.01)

(58) Field of Classification Search
CPC . Y10T 409/304088; Y10T 409/304144; Y10T 409/306216; Y10T 409/306384; Y10T 409/306496; Y10T 409/306608; Y10T 408/50; Y10T 408/44; B23Q 11/00; B23Q 11/02; B23Q 11/0046; B23Q 11/0071; B23C 1/20; B23C 2230/00; B23B 2270/30; B23B 2270/62; B23B 2260/058; B23B 47/34; B23B 45/00; B23B 45/14

USPC .............. 144/252.1, 136.95, 154.5
See application file for complete search history.

(56) References Cited

U.S. PATENT DOCUMENTS 5,667,565 A * 9/1997 Gondar .................. B03C 3/017
                                                    15/1.52
7,290,967 B2 * 11/2007 Steimel ............. B23Q 11/0046
                                                    144/252.1
7,625,265 B2 * 12/2009 Woods .................. B24B 55/102
                                                    451/359

(Continued)

OTHER PUBLICATIONS

Bornemann, "Hollow Cutter Retrofit Kit", www.bornemann-mb.de.

*Primary Examiner* — Nicole N Ramos
(74) *Attorney, Agent, or Firm* — Tiffany N. Logan; Parks IP Law LLC

(57) ABSTRACT

An indexable plenum and a method of using the plenum to collect dust and/or debris during a cutting or milling process are disclosed. The plenum, when attached to the spindle nose of a conventional machine, enables the conventional machine that does not have a hollow spindle nose to be used with a hollow or conventional solid cutter to remove dust and/or debris generated during the cutting process. The indexable plenum comprises a hollow body and a base plate. Hollow bodies of different shape and size that are able to fit differently shaped and sized cutters are disclosed. The hollow bodies can be designed to releasably engage with the same base plate such that when the base plate is attached to the machine spindle nose, hollow bodies can be exchanged during a milling or cutting process to accommodate correspondingly shaped/sized cutters. In various embodiments, the object that is cut or milled is low density foam.

14 Claims, 11 Drawing Sheets

(56) References Cited

U.S. PATENT DOCUMENTS

| | | | | |
|---|---|---|---|---|
| 8,397,342 | B2* | 3/2013 | Baker | B08B 15/04 |
| | | | | 134/21 |
| 2007/0251198 | A1* | 11/2007 | Witter | B01D 45/12 |
| | | | | 55/300 |
| 2009/0060670 | A1* | 3/2009 | Sugano | B23B 51/02 |
| | | | | 408/230 |
| 2010/0089497 | A1* | 4/2010 | Keenan | B23Q 11/0046 |
| | | | | 144/252.1 |
| 2013/0198996 | A1* | 8/2013 | King, Jr. | A47L 9/02 |
| | | | | 15/415.1 |

\* cited by examiner

INDEXABLE PLENUM

TECHNICAL FIELD

The present disclosure relates generally to using an indexable plenum for dust collecting and, more particularly, to such an indexable plenum and methods of making and using the plenum.

BACKGROUND

Milling under computer numeric control (CNC) is a common way to form objects of a pre-determined shape in a wide range of industries, including consumer electronics, home products and appliances, farming, construction equipment, transportation systems, automotive, and the like.

Dust and debris generated during a milling process can pose considerable challenges to the milling-process operator and other involved personnel, including being difficult to remove. This problem is particularly pronounced during the milling of foamed plastics including styrofoam and polyurethane. During the milling of such low density foam, the debris generated can cling to other objects, making it difficult to remove. Special machines having hollow cutters have been designed to efficiently remove milling debris. These special machines have a hollow spindle nose that is connected to vacuum on one end and the hollow cutter on the opposite end. During the milling process, the majority of the debris generated is sucked into the hollow cutter through the hollow spindle nose for removal.

While efficient, these special machines are relatively expensive, take up a good amount of space, and are not always available for a given milling facility. Instead, milling facilities are more commonly equipped with conventional milling machines that do not have the hollow spindle nose. Attempts have been made to retrofit the conventional spindle nose on milling machines. One such attempt provides a hollow cutter retrofit kit, shown in FIG. 1. The kit comprises a suction hood 12, a special adapter 14 for a hollow cutter 16, and a swivel nut 18. The suction hood 12 has a hollow arm 22 that is to be connected to a vacuum source. During operation, the adaptor 14 is fitted onto the hollow cutter 16 by the swivel nut 18 to form a modified cutter. When the suction hood and the modified cutter are fitted onto a machine spindle nose 20, the special adapter 14 fits into the suction hood 12 to provide vacuum to the hollow cutter 16.

This conventional retrofit kit has numerous shortcomings including, and not limited to, that it is designed to be used only with the certain type of hollow cutter shown, the cutter has to be modified with a special adaptor to be useful for the kit, and the suction hood is specific for a given machine and cutter such that a different hollow cutter demands an entirely new kit. Better utilizing existing conventional milling machine while having the capability to remove the debris during a milling process remains a challenge.

SUMMARY

The present technology relates to an indexable plenum that can be used with conventional and to-be developed milling machines to remove debris by vacuum during a milling process. Both solid and hollow cutters can be used with the plenum on all or most any milling machine while allowing vacuum to be applied to remove debris during the milling process. The plenum can be made by thermoplastic molding or through 3D printing using thermoplastic ink, for instance.

The disclosed method enables conventional or new milling machines to be used with hollow or solid cutters while applying vacuum to remove debris generated during a cutting process. The plenum is indexible such that during a milling process, when different sized cutter is used, a matching plenum can be exchanged to accommodate the cutter accordingly.

Benefits of the technique include, and are not limited to, using existing cutters and milling machines while achieving the capacity of being able to apply vacuum around or through the cutter during the milling process.

Time, space, and cost are saved, for instance, because a new machine is not needed to apply vacuum while cutting. The previous need of using a new machine with a hollow spindle nose to applying vacuum while cutting, can be replaced with much simpler and cost-effective approaches, in various embodiments using different cutters and matching plenums on a conventional or new milling machine having a spindle nose.

Other aspects of the present technology will be in part apparent and in part pointed out hereinafter.

Figure 1:
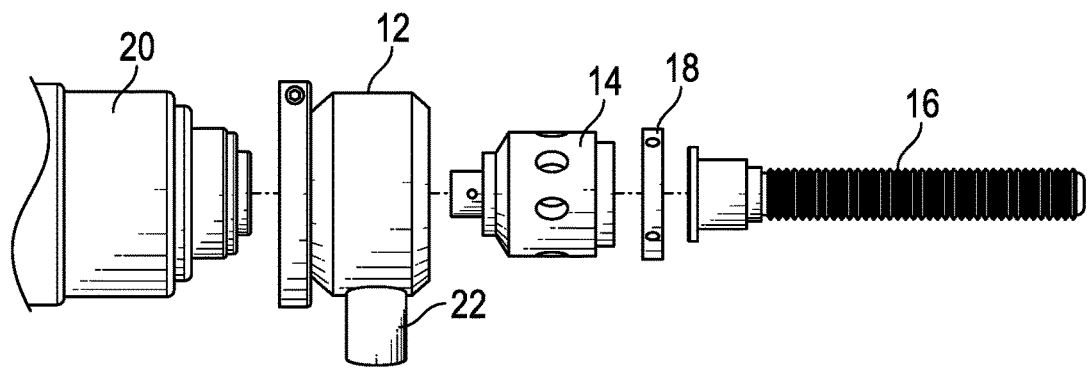
FIG. 1 is a view of a conventional hollow cutter retrofit kit.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like. In certain embodiments, some or all operations (e.g., controlling a machine to mill an object or printing a plenum with a 3D printer) are performed by, or at least initiated by a computing device, such as a processor executing computer-executable instructions stored or included at a computer-readable medium. And any one or more steps of the process can be performed, initiated, or otherwise facilitated by automated machinery, such as robotics and 3D printer.

I. General Overview of the Disclosure

The present disclosure describes an indexable plenum to be used with conventional milling machines to apply vacuum around and/or through a cutter during a cutting process. The indexable plenum comprises a hollow body and a base plate. The hollow body of the plenum has a top end having a top opening, a bottom end having a bottom opening, and a conduit situated between the top end and the bottom end, bifurcated from and in fluid communication with the hollow body. The base plate has a machine side, a plenum side, and a base-plate opening, with the plenum side releasably engageable to the top opening of the hollow body.

The cutter generally has a base portion that engages with a conventional or new type of machine spindle nose and a cutter portion that does the actual cutting. Based on the shape and size of the cutter, a matching plenum is selected such that when the cutter is assembled with the plenum to form a plenum cutter assembly on the machine spindle nose, the base portion is situated inside the hollow body and at least a portion of the cutter portion is situated outside of the plenum. In the plenum cutter assembly, there is a body clearing between the hollow body and the cutter and a bottom clearing between the cutter and the bottom opening of the hollow body. In various embodiments, because of the body clearing and the bottom clearing, during the operation of the machine spindle nose, the plenum does not touch the cutter and remains stationary.

When using the plenum to collect debris during the cutting of an object, the machine side of the base plate of the plenum is first sealingly attached onto a stationary portion of a machine spindle nose of a machine. The cutter is then engaged with the machine spindle nose. A matching hollow body is then selected and assembled with the base plate to form the plenum cutter assembly. To apply vacuum, the conduit of the plenum is connected to a vacuum source. During cutting, vacuum is applied to the conduit to create vacuum around the cutter. The dust or debris generated during the cutting process enters the hollow body through the bottom clearing into the body clearing and into the conduit where it is vacuum removed.

The cutter can be solid or hollow. Hollow cutters can have, for instance, a hollow center, a tip opening at the tip of the cutter portion, and cutter base opening(s) near the base portion. In such a hollow cutter, the tip opening, the cutter base opening, and the hollow center are all in fluid, or flow, communication with each other. When a hollow cutter is used in the cutting process while vacuum is applied through the plenum, the dust or debris generated enters through the bottom clearing into the body clearing and some of it also enters the tip opening, travels through the hollow center, and exits the cutter base opening(s) to the body clearing, where it is vacuum removed. Conventional or new machines with a conventional or new type of spindle nose when fitted with a plenum disclosed herein thus can be used with hollow or solid cutters while having vacuum applied to the cutter during a milling process.

System components, algorithm, and operations are described further below with reference to the figures.

II. Process, System Components, and Workpieces—FIGS. 2-8

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology.

Figure 2:
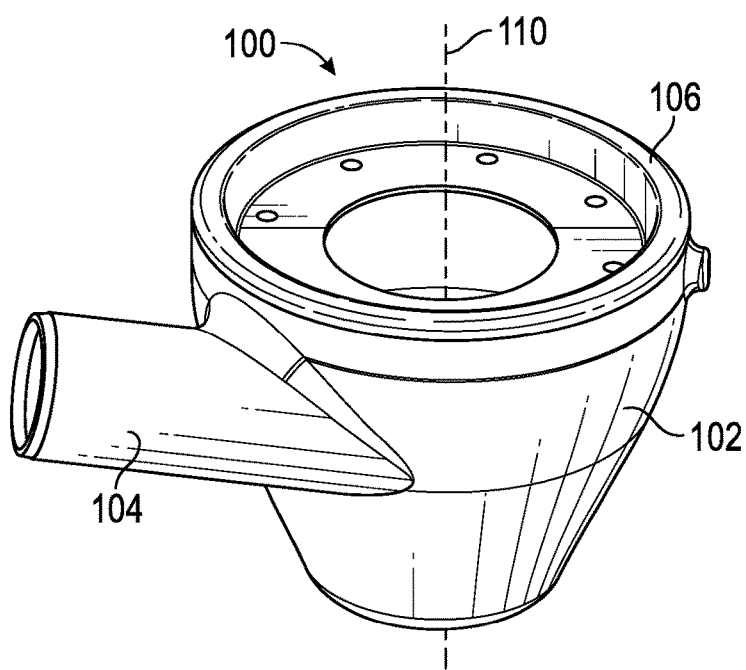
FIG. 2 is a top perspective view of a schematic diagram of a plenum with its hollow body and base plate engaged.
Figure 2B:
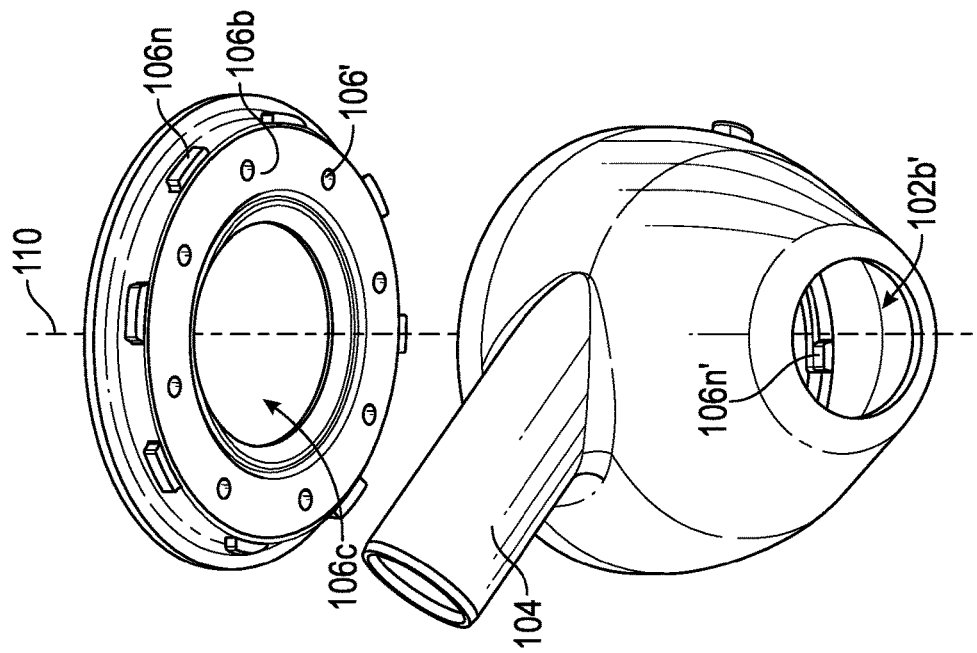
FIG. 2B is a bottom perspective view of the plenum of FIG. 2 with its base plate disengaged from its hollow body.
Figure 2A:
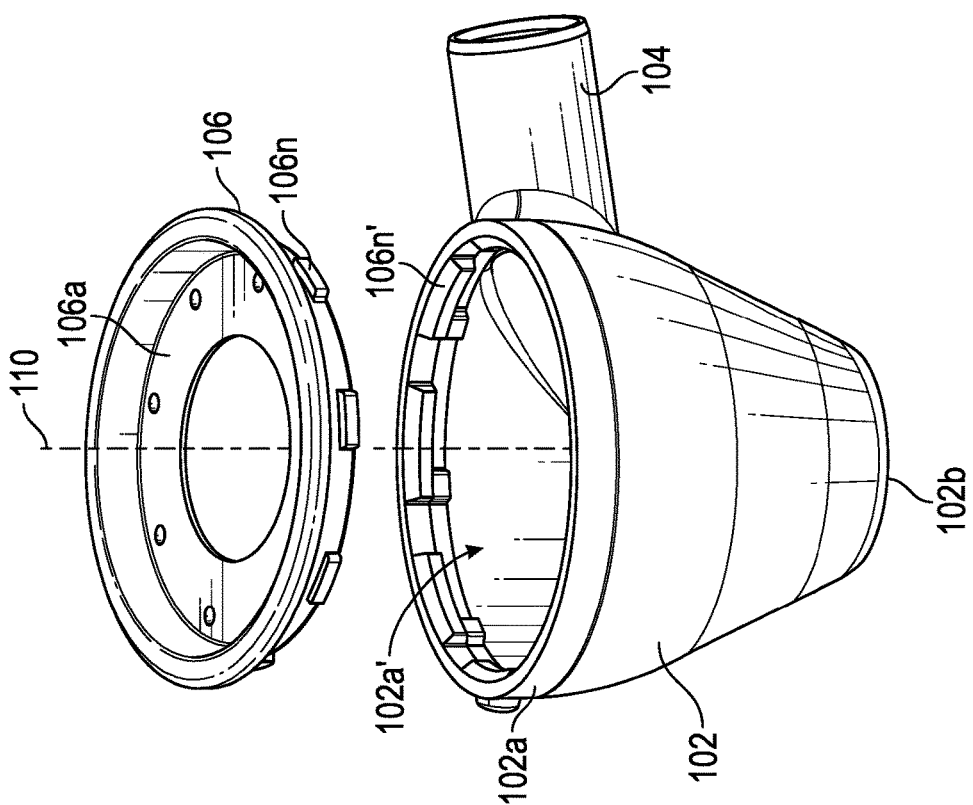
FIG. 2A is a top perspective view of the plenum of FIG. 2 with its base plate disengaged from its hollow body.

Turning again to the figures, and more particularly, to FIG. 2, a top perspective view of a plenum 100 is shown to have its hollow body 102 engaged with a base plate 106 according to embodiments of the present disclosure. A top perspective view of the plenum 100 of FIG. 2, with its base plate 106 disengaged from its hollow body 102, is shown in FIG. 2A. A bottom perspective view of the plenum 100 of FIG. 2, with its base plate 106 disengaged from its hollow body 102, is shown in FIG. 2B. Referring to FIG. 2A and FIG. 2B, the hollow body 102 has a top end 102a having a top opening 102a', a bottom end 102b having a bottom opening 102b', and a tangentially oriented conduit 104 being part of or connected to the hollow body between the top end 102a and the bottom end 102b. The tangentially oriented conduit 104 bifurcates from the hollow body 102 and is in fluid or flow communication with the hollow body 102. The top end 102a comprises a plurality of notches 106n' to be engaged with base plate 106. The base plate 106 has a machine side 106*a*, a plenum side 106*b*, a base opening 106*c*, and a plurality of notches 106*n* that can be releasably engaged with the notches 106*n'* of the hollow body. The plenum 100 has a vertical axis 110 that runs through the vertical center of the plenum such that the axis runs through the centers of the top, the bottom, and base openings 102*a'*, 102*b'* and 106*c* when the hollow body 102 is engaged with the base plate 106.

Figure 3:
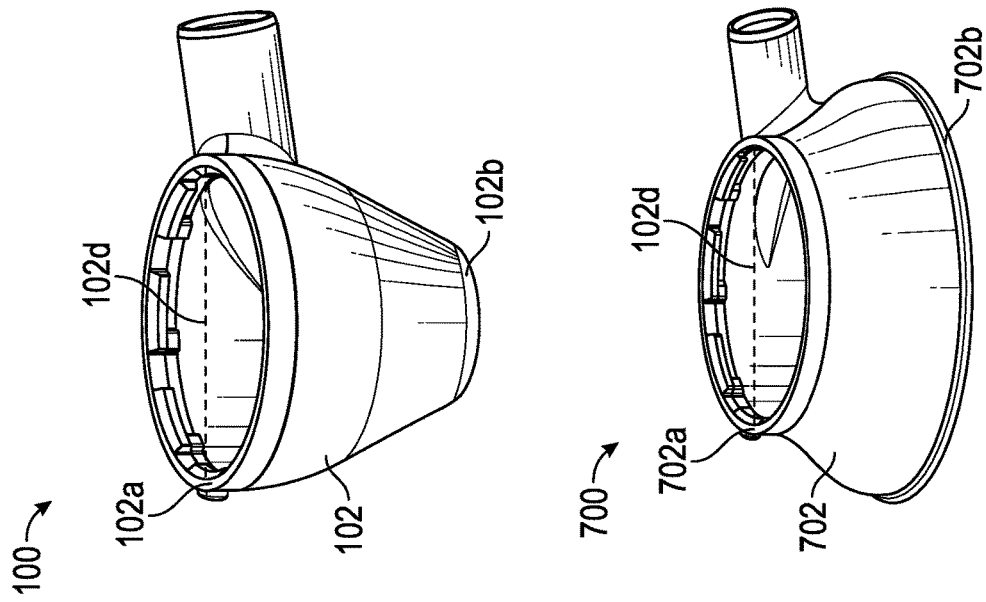
FIG. 3 is a schematic diagram of four plenums, without base plates, having the same top end and different bottom ends.
Figure 3:
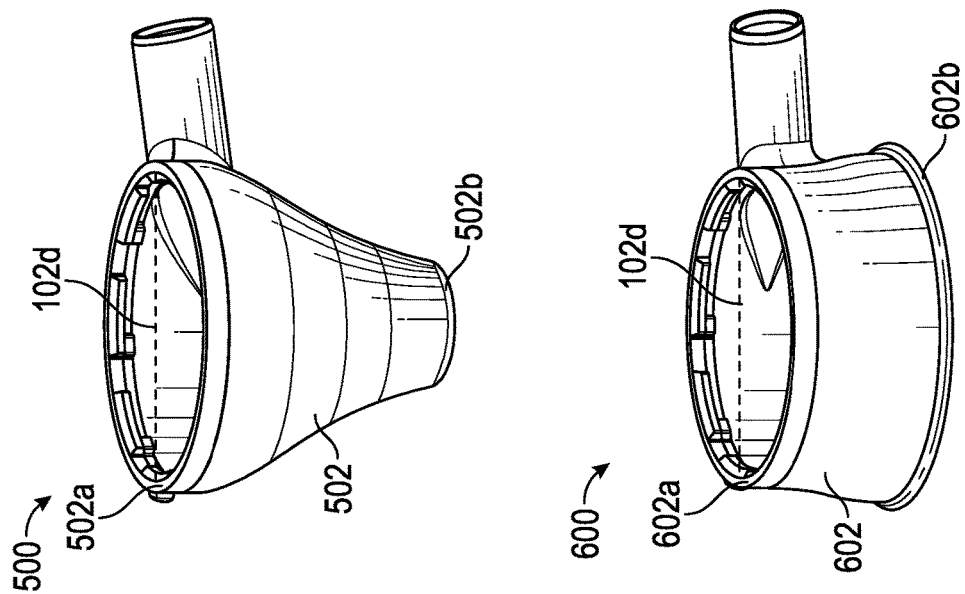

Referring to FIG. 3, four plenums having the same top end and different bottom ends are shown. Plenum 500 is shown to have a hollow body 502 having a top end 502*a* and a bottom end 502*b*. Plenum 100 is shown to have a hollow body 102 having a top end 102*a* and a bottom end 102*b*. Plenum 600 is shown to have a hollow body 602 having a top end 602*a* and a bottom end 602*b*. Plenum 700 is shown to have a hollow body 702 having a top end 702*a* and a bottom end 702*b*. Despite the different bottom ends, plenums 100, 500, 600, and 700 all have top openings that are of the same diameter 102*d* and notches and can be fitted with the same base plate 106 (shown in FIGS. 2A and 2B). The plenums are designed to accommodate hollow cutters of different shape and sizes while remaining indexible with the same base plate. While the body 502 can have other diameters 102*d* without departing from the scope of the present technology, in various embodiments the diameter 102*d* is between about 100 mm and about 300 mm. The indexable plenum disclosed herein generally comprises, a hollow body having a top end having a top opening and a bottom end having a bottom opening, a conduit situated between the top end and the bottom end, bifurcated from and in fluid or flow communication with the hollow body, and a base plate having a machine side, a plenum side, and a base-plate opening, with the plenum side releasably engageable to the top opening. Although notches are shown in the figures, other common releasably engageable complementary interlocks such as thread can also be used to engage the base plate with the hollow body. In some embodiments, the base plate and the hollow body are clamped together. In some embodiments, the base plate and the hollow body are bound together with for example, fasteners such as Velcro.

The machine side of the base plate is sized to be sealingly attachable to a stationary portion of a machine spindle nose of a machine and when a cutter is engaged with the machine spindle nose there is clearance between the cutter and the top opening, the bottom opening, or the hollow body. In one embodiment, the hollow body is readily engageable with the base plate at angular intervals such that the position of the conduit relative to the machine can be readily adjusted. The base plate can be attached to the machine spindle nose through glue, bolt, clamp, fastener, and/or binding. For example, in the embodiment disclosed in the figures, the base plate comprises features such as holes 106' patterned to be engaged with respectively patterned holes, bolts, or other corresponding features of the stationary portion of a machine spindle nose.

When in operation, the vacuum is applied to the plenum through the conduit. The conduit can be shaped and positioned such that the when it is connected with a vacuum source, it does not interfere with the operation of the machine, as shown for example in FIG. 5. In one embodiment, the conduit is tangentially-oriented.

The indexable plenum disclosed herein can be made by casting, molding or 3D printing. Since the plenums disclosed herein are made to match cutters of various shapes and sizes, when designing and programming the design, the sizes and shapes of the cutters are taken into consideration. Consideration is given to, for example, maintaining smooth size transitions in order to facilitate free flow of air and cutting debris regardless of cutter size. For instance, when a 3D printing method is used to make the plenum, design and programming based on a given cutter size is input into a computer, which runs the 3D printer to print out the designed plenum with thermoplastic ink. Suitable 3D printed materials for printing the plenums described herein include ABS, PLA, nylon, polypropylene, or other rigid, durable thermoplastic. The base plate and the hollow body of a plenum can be made from the same or different materials. For example, the base plate can be made from a higher density thermoplastic than those used for the hollow body.

Figure 4:
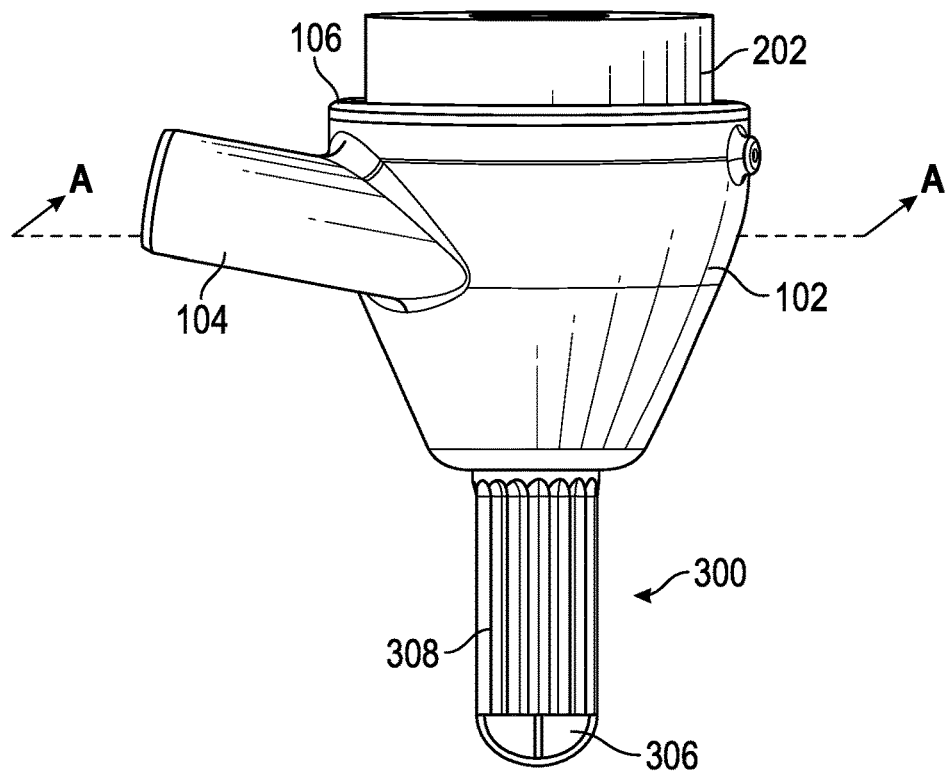
FIG. 4 is a schematic diagram of the plenum of FIG. 2 fitted with a hollow cutter.
Figure 4A:
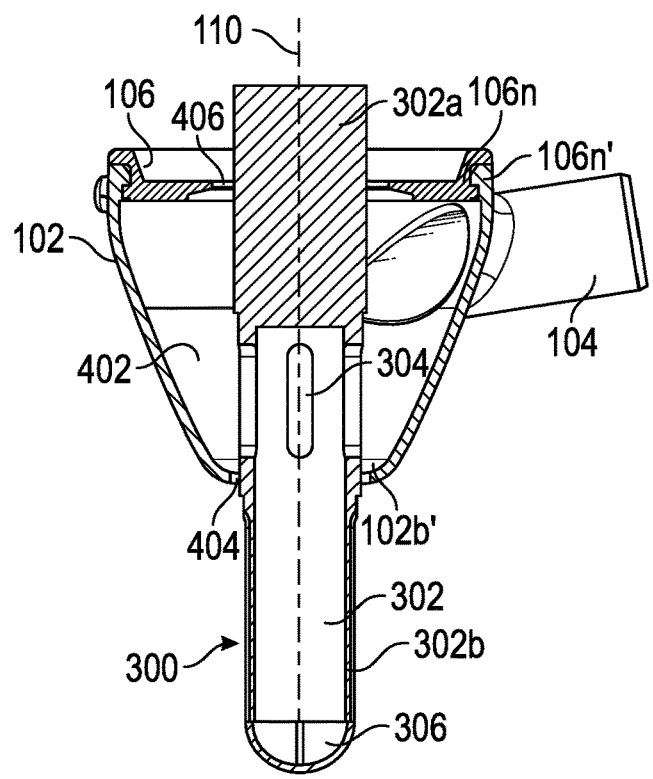
FIG. 4A is a cross-sectional side view along the A-A line of FIG. 4, showing the body clearing, the bottom clearing, and cutter base opening.

A schematic diagram of the plenum of FIG. 2 fitted with a hollow cutter 300 is shown in FIG. 4. A cross-sectional side view of FIG. 4 along the A-A line is shown in FIG. 4A. Referring to FIG. 4 and FIG. 4A, the hollow cutter 300 is shown to have a hollow center 302, a base portion 302*a* having a cutter base opening 304, a cutter portion 302*b* with tip opening 306, and cutter teeth 308. The tip opening and the cutter base opening are in fluid or flow communication with the hollow center of the cutter. The base plate 106 is shown to be attached to a machine spindle nose 202. The hollow body 102 is engaged with the base plate 106 through the engagement of notches 106*n* and 106*n'*. The vertical axis 110 of the plenum 100 is in align with the vertical axis of the hollow cutter 300 such that there is a body hollow or clearing 402 between the cutter 300 and the hollow body 102. The cutter 300 fits closely to the bottom opening 102*b'* of the hollow body 102 such that there is a bottom clearing 404 between the cutter 300 and the bottom opening 102*b'*. The cutter 300 fits closely to the top opening 102*a'* of the hollow body 102 such that there is a top clearing 406 between the cutter 300 and the bottom opening 102*a'*.

An indexable plenum cutter assembly described herein comprises a hollow cutter and a matching indexable plenum. The hollow cutter has a hollow center, a base portion, a cutter portion, and a cutter base opening near the base portion that is in direct fluid or flow communication with the hollow center. In the assembly, the hollow cutter is fitted with the plenum such that the base portion of the cutter including the cutter base opening is situated inside the hollow body and at least a portion of the cutter portion is placed outside of the hollow body. In the indexable plenum cutter assembly, there are a body clearing between the hollow body and the cutter, a top clearing between the cutter and the top opening, and a bottom clearing between the cutter and the bottom opening. The bottom clearing between the bottom opening and the hollow cutter can be made narrow or tight, for example, less than about 5 mm, about 4 mm, about 3 mm, about 2 mm, about 1 mm, about 0.5 mm or in some embodiments any number between about 0.5 mm and about 5 mm in size. The narrow bottom clearing ensures adequate vacuum is applied through the hollow center of the hollow cutter during the cutting process.

For solid cutters, an indexable plenum cutter assembly comprises a solid cutter and a matching indexable plenum. The solid cutter has a base portion and a cutter portion. The cutter is fitted inside the plenum such that the base portion of the cutter is situated inside the hollow body and at least a portion of the cutter portion is situated outside the hollow body. There are a body clearing between the hollow body and the cutter, a top clearing between the cutter and the top opening, and a bottom clearing between the cutter and the bottom opening. The bottom clearing between the bottom opening and the hollow cutter can be relatively large, for example, at least about 5 mm, about 10 mm, about 15 mm, about 20 mm, about 25 mm, about 30 mm, or anywhere between these values, in size.

Figure 4B:
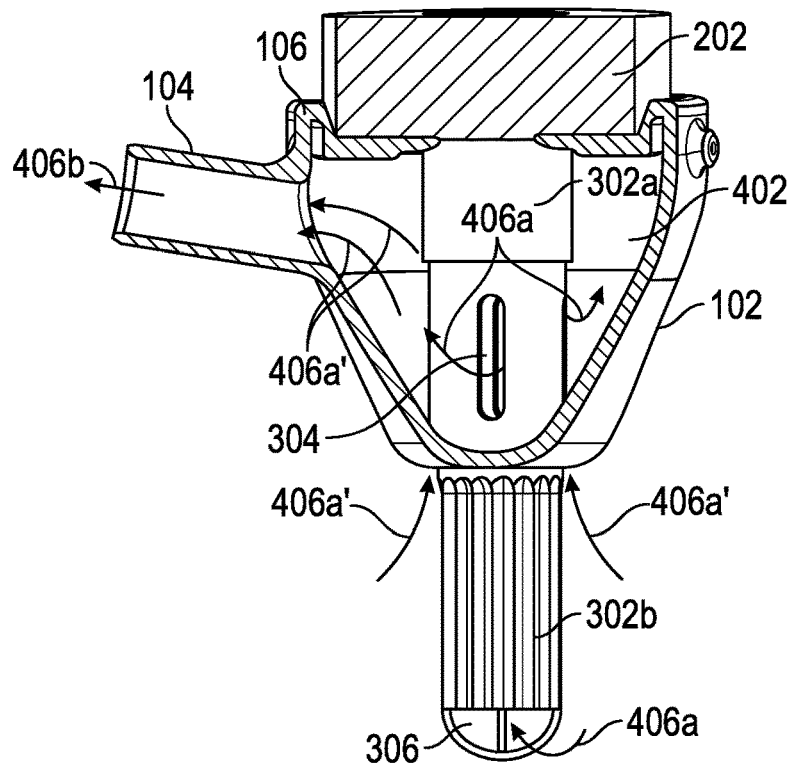
FIG. 4B is a dissected view of FIG. 4 where a portion of the hollow body is removed to reveal the cutter, the body clearing, and paths of air flow when vacuum is applied.
Figure 4C:
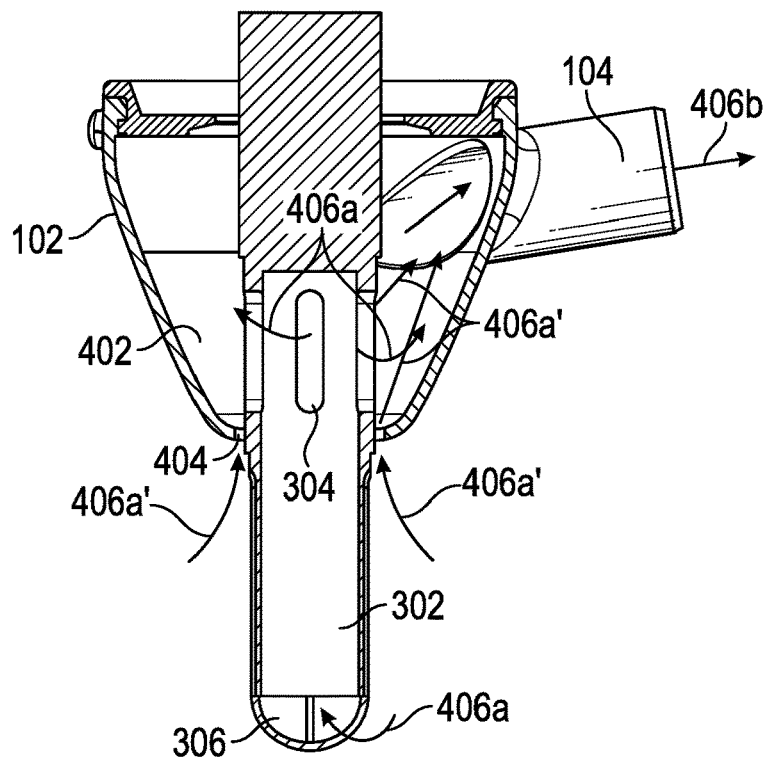
FIG. 4C is the view of FIG. 4A showing paths of air flow when vacuum is applied.

A dissected view of FIG. 4 where a portion of the hollow body 102 is removed is shown in FIG. 4B. The cross-sectional view of FIG. 4A is shown in FIG. 4C revealing the body clearing 402, the bottom clearing 404, and paths of air flow when vacuum is applied. Specifically, air 406a enters the tip opening 306 of the cutter 300, through the cutter hollow center 302, exits the cutter base opening 304 to enter the body clearing 402 where it enters the tangentially-oriented conduit 104 and is discharged. Additionally, because of the presence of the bottom clearing 404, when under vacuum, air 406a' enters the body clearing 402 through the bottom clearing 404, where it is mixed with the air 406a from the tip of the hollow cutter and the mixed air 406b enters the tangentially-oriented conduit 104 and is discharged through a vacuum hose.

Methods of using a plenum to collect debris during the cutting of an object are disclosed herein. The machine side of the base plate is first attached onto a stationary portion of a machine spindle nose of a machine. A cutter is then engaged to the machine spindle nose. After the cutter is engaged, a hollow body that matches the shape and size of the cutter is engaged with the base plate to form an indexable plenum cutter assembly such that the base portion of the cutter is situated inside the hollow body and at least a portion of the cutter portion is situated outside the hollow body, and there are a body clearing between the hollow body and the cutter and a bottom clearing between the cutter and the bottom opening of the hollow body, and during the operation of the machine spindle nose, the plenum remains stationary. When engaging the hollow body, the position or orientation of the conduit is adjusted such that it does not interfere with the operation of the machine. During cutting, vacuum is applied to the plenum through the conduit. The dust or debris generated during the cutting process enters the hollow body through the bottom clearing into the body clearing and into the conduit where it is vacuum removed.

When hollow cutters are used, after the base plate is attached, or if the base plate is already in place, a hollow cutter is engaged with the machine spindle nose. After the cutter is engaged, a matching hollow body is engaged with the base plate to form an indexable plenum cutter assembly such that the base portion including the cutter base opening of the cutter is situated inside the hollow body and at least a portion of the cutter portion is situated outside the hollow body, and there are a body clearing between the hollow body and the cutter and a bottom clearing between the cutter and the bottom opening of the hollow body, and during the operation of the machine spindle nose, the plenum remains stationary. When engaging the hollow body, the position or orientation of the conduit is adjusted such that it does not interfere with the operation of the machine. During cutting, the dust or debris generated during the cutting process enters the hollow body either through the bottom clearing into the body clearing or through the tip opening, along the hollow center, exits the cutter base opening into the body clearing where the dust and debris enters the conduit and is vacuum removed.

The plenums can be made indexable. For example, the top opening of the hollow bodies can be made to be the same size, each with complementary notches or threads to engage the same base plate. If the cutting process demands a different cutter, the hollow body can simply be disengaged from the base plate, a different cutter with its matching hollow body can then be attached and engaged to form a new plenum cutter assembly for subsequent cutting. The object that is suitable for cutting is a machinable substrate, the cutting of which generates objectionable, unwanted, meddling debris that should be evacuated from the cutting area. For instance, during low density foam cutting, the debris generated from the cutting can interfere with the milling process and difficult to remove. Using the plenum cutter assembly approach described herein, the foam debris is removed by vacuum during the cutting process, obviating or at least significantly reducing impact of the debris on the surrounding cutting area.

Figure 5:
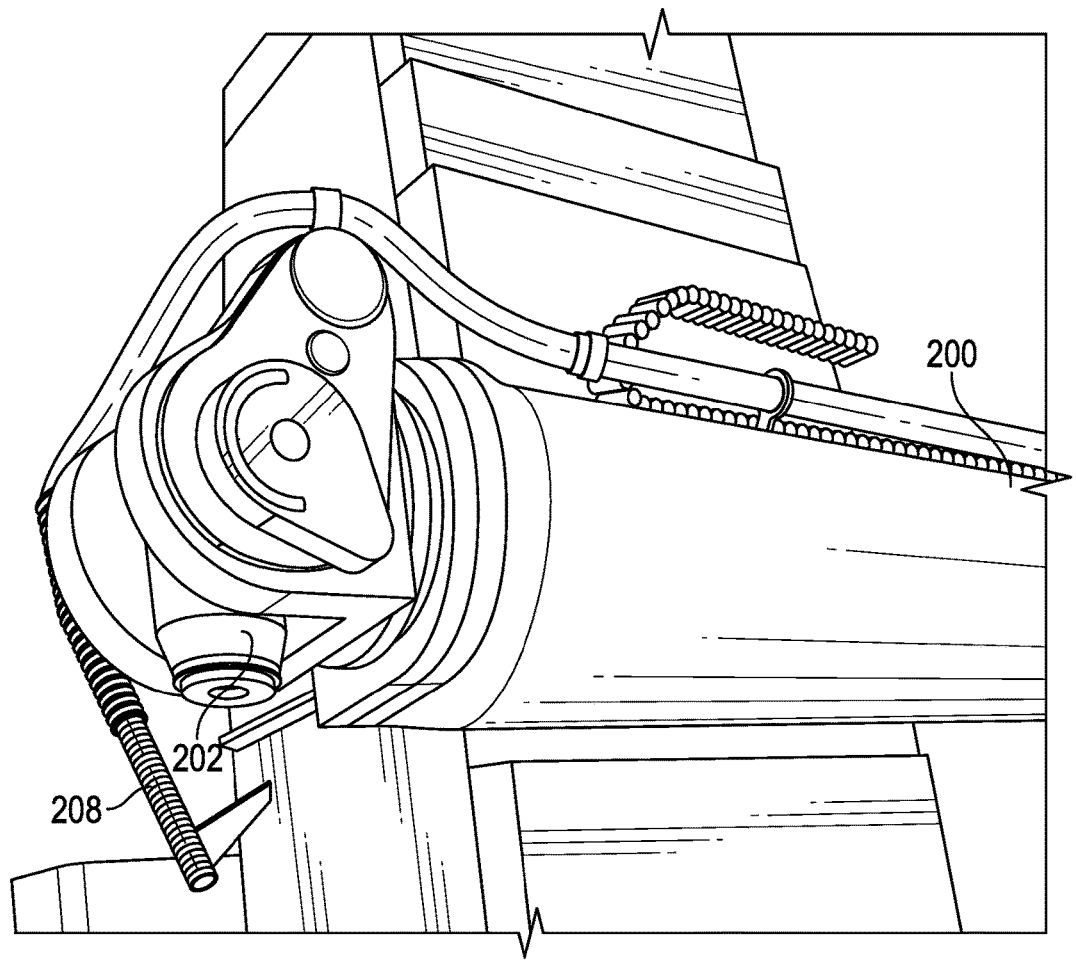
FIG. 5 is a view of a machine having a machine spindle nose and being fitted with a vacuum hose.
Figure 5A:
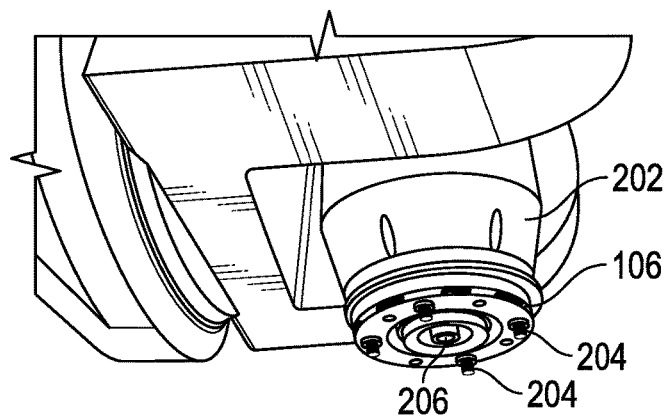
FIG. 5A is a close-up view of the machine spindle nose of FIG. 5 having a base plate bolted on the spindle nose through bolts, leaving the center of the spindle nose accessible to be engaged with a cutter.
Figure 5B:
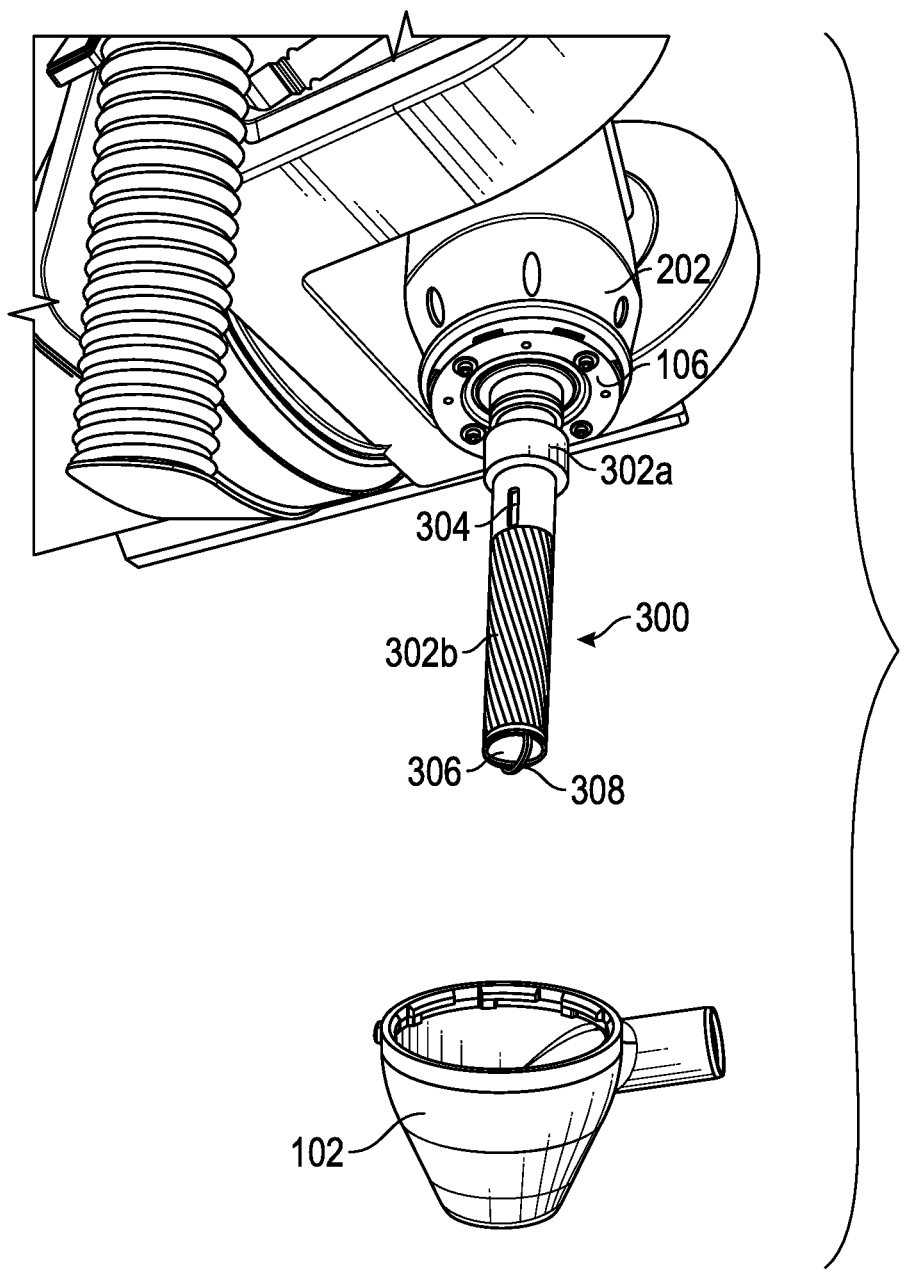
FIG. 5B shows a hollow cutter engaged with the machine spindle nose and a hollow body of a plenum ready to be engaged.
Figure 5C:
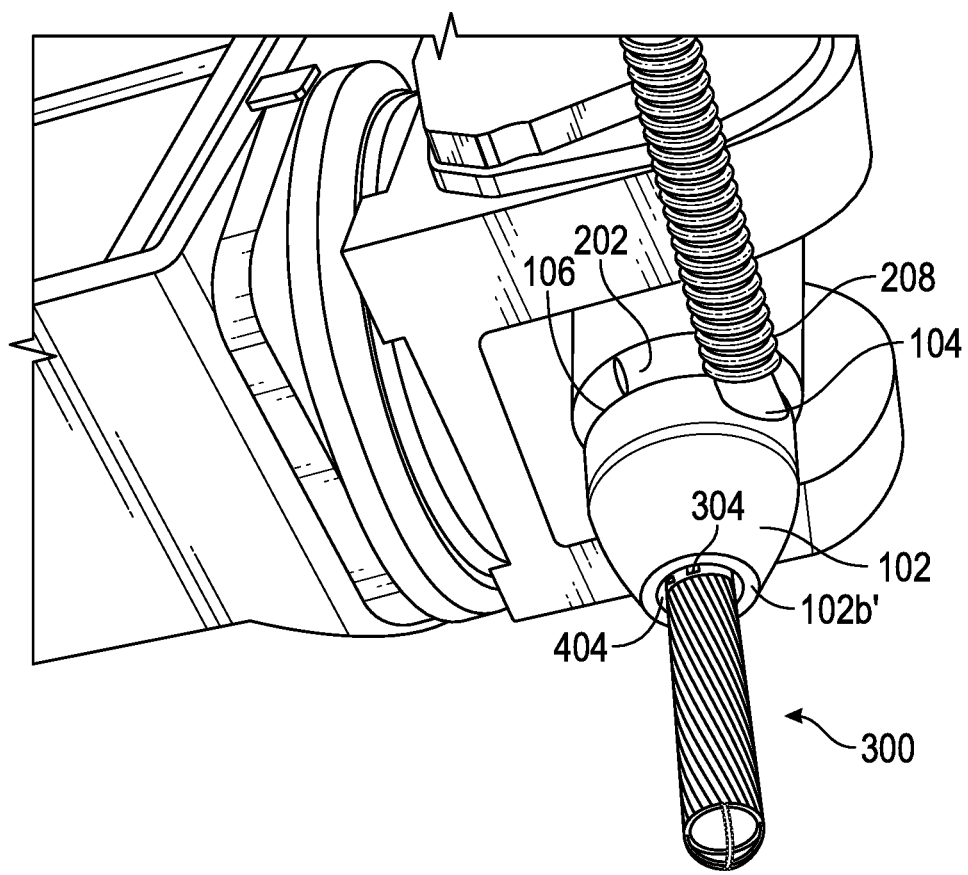
FIG. 5C shows the hollow body of the plenum of FIG. 5B engaged with the base plate and the cutter forming a plenum cutter assembly.

Referring to FIG. 5, a view of a machine 200 having a machine spindle nose 202 and fitted with a vacuum hose 208 is shown. A close-up view of the machine spindle nose 202 of FIG. 5 is shown in FIG. 5A. The machine spindle nose 202 has a base plate 106 bolted on the spindle nose 202 through bolts 204, leaving the center of the spindle nose 206 accessible to be engaged with a cutter. A view of a cutter 300 engaged with the machine spindle nose 202 is shown in FIG. 5B. The cutter is shown to have the base portion 302a engaged with the spindle nose 202. Tip opening 306, cutter portion 302b, and the cutter base opening 304 are all visible. A view of a hollow body 102 of a plenum 100 is shown at the lower half of FIG. 5B. The hollow body 102 engaged with the base plate 106 and the cutter 300 forming a plenum cutter assembly is shown in FIG. 5C. The cutter base opening 304 is shown to be residing inside the hollow body 102 and there is a bottom clearing 404 between the cutter 300 and the bottom opening 102b' of the hollow body 102. The tangentially-oriented conduit 104 of the plenum 100 is attached to the vacuum hose 208.

Figure 6:
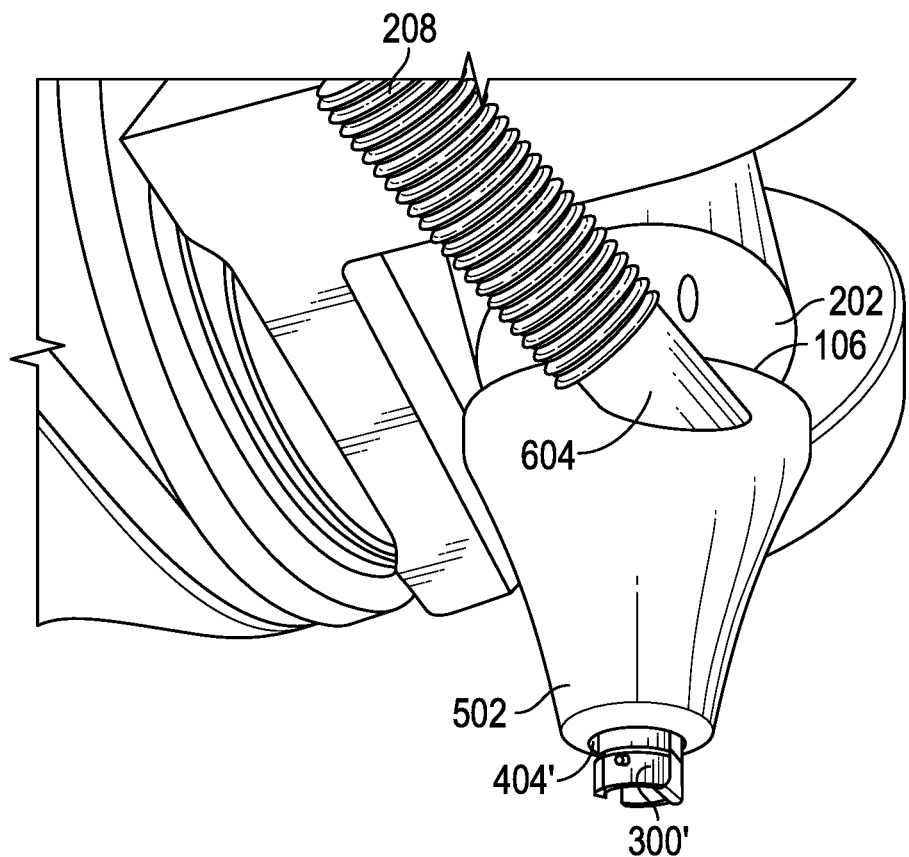
FIG. 6 shows another hollow body, engaged with the base plate and assembled with a second cutter to form another plenum cutter assembly, and the hollow body of the other plenum prior to its engagement with base plate.
Figure 6:
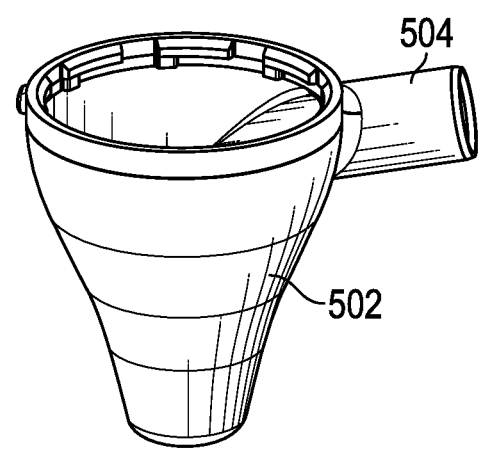

A view of another hollow body 502, engaged with the base plate 106 (not shown) and assembled with a second cutter 300' to form another plenum cutter assembly is shown in FIG. 6. A bottom clearing 404' is visible between the plenum and the cutter 300'. The hollow body 502 prior to engagement with base plate 106 is shown in the bottom portion of FIG. 6. In this embodiment, the cutter is solid and not a hollow cutter and during machine operation, the air is only drawn through bottom clearing 404' to be discharged.

Figure 7:
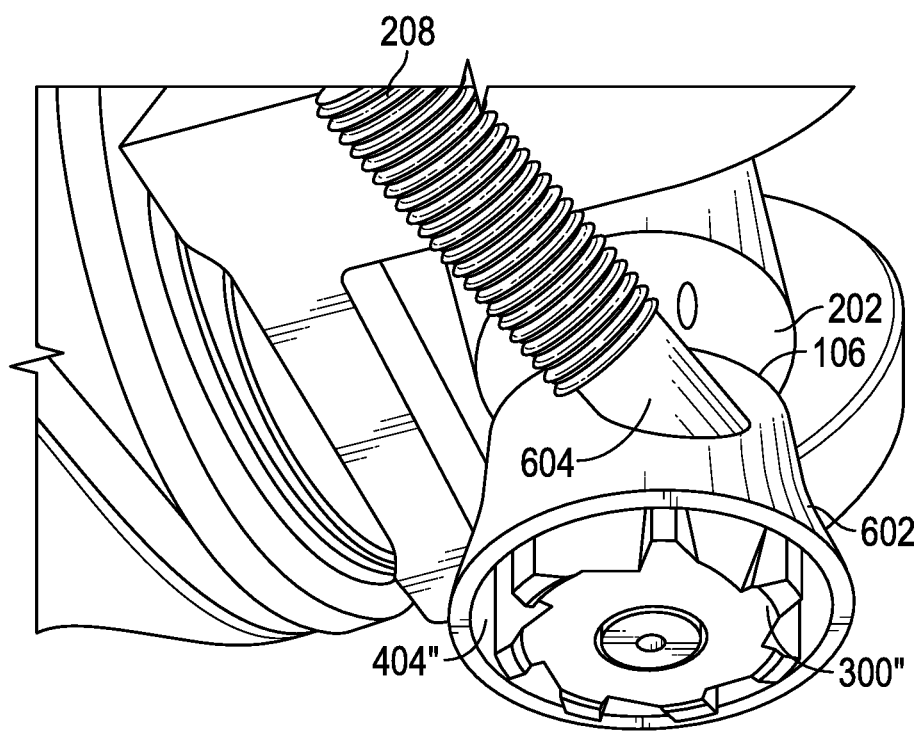
FIG. 7 shows a third embodiment of a hollow body, engaged with base plate and assembled with a third cutter to form a third plenum cutter assembly, showing the hollow body of the plenum according to the third embodiment prior to its engagement with the base plate.
Figure 7:
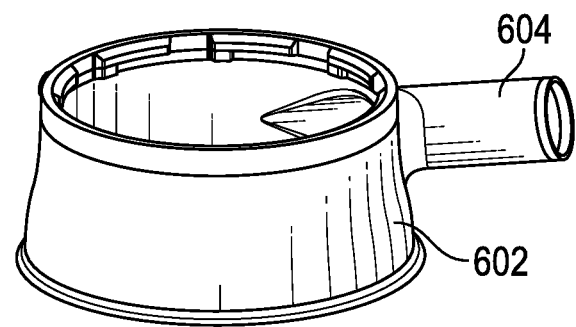

A view of a third embodiment of a hollow body 602, engaged with the base plate 106 and assembled with a third cutter 300" to form a third plenum cutter assembly is shown in FIG. 7. The hollow body 602 prior to engagement with base plate 106 is shown in the bottom portion of FIG. 7. The plenum cutter assembly is attached to the machine spindle nose 202 through the base plate 106. The tangentially-oriented conduit 604 of the hollow body 602 is attached to the vacuum hose 208. A bottom clearing 404" is visible between the plenum and the cutter 300". Similar to the embodiment shown in FIG. 6, the embodiment shown in FIG. 7 has solid cutter 300". The solid cutter 300" is not a hollow cutter and during machine operation, the air is only drawn through bottom clearing 404" to be discharged.

Figure 8:
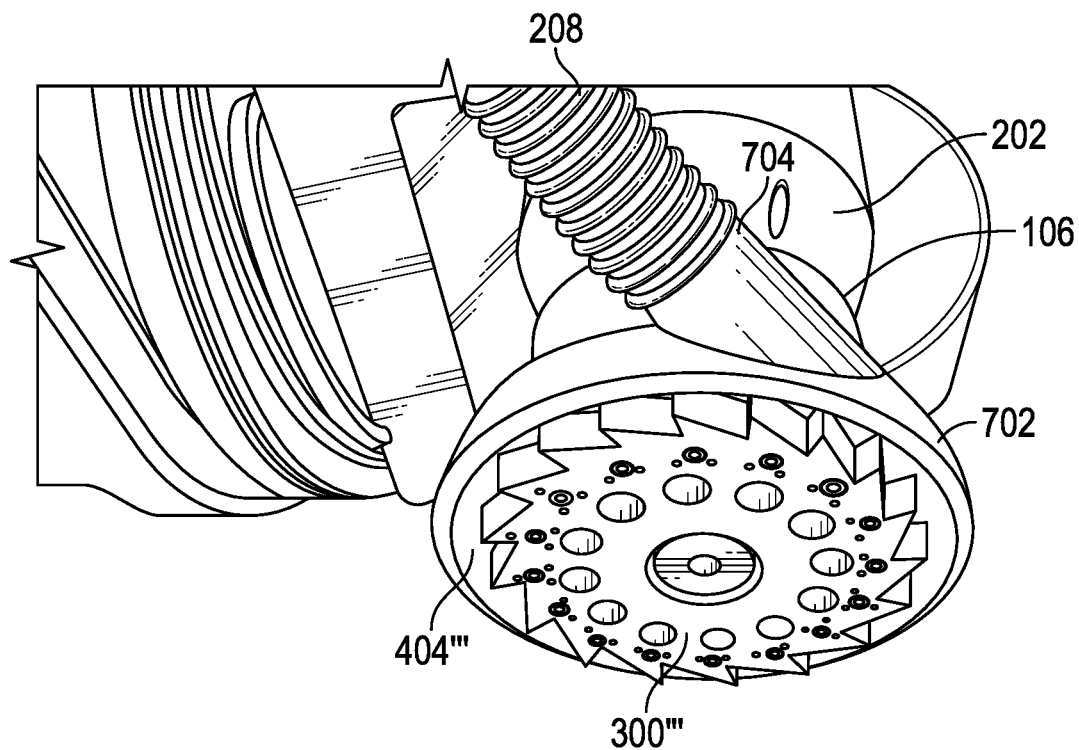
FIG. 8 shows a fourth embodiment of a hollow body, engaged with the base plate and assembled with a fourth cutter to form a fourth plenum cutter assembly, showing the hollow body of the plenum according to the fourth embodiment prior to its engagement with the base plate.
Figure 8:
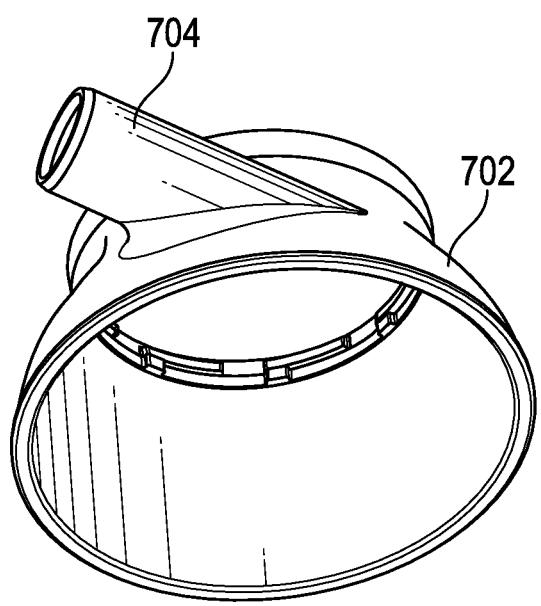

A view of a fourth embodiment of a hollow body 702, engaged with the base plate 106 and assembled with a fourth cutter 300''' to form a fourth plenum cutter assembly is shown in FIG. 8. The hollow body 702 prior to engagement with base plate 106 is shown in the bottom portion of FIG. 8. The plenum cutter assembly is attached to the machine spindle nose 202 through the base plate 106. The tangentially-oriented conduit 704 of the hollow body 702 is attached to the vacuum hose 208. A bottom clearing 404''' is visible between the plenum and the cutter 300'''. Similar to the embodiment shown in FIG. 6, the embodiment shown in FIG. 8 has solid cutter 300". The solid cutter 300" is not a hollow cutter and during machine operation, the air is only drawn through bottom clearing 404''' to be discharged.

III. Example Advantages of Implementation

Many of the advantages of the present technology are outlined above. Some are described further in this summary.

Benefits include reduced production time and cost by expanding the function of existing machines and machine parts. Additionally, space to accommodate new machine is saved.

Time and cost are saved, for instance, by using existing machine and cutters while achieving the results of applying vacuum to the cutter during the cutting process to collect debris and dust generated.

IV. Conclusion

The above-described embodiments are merely exemplary illustrations of implementations set forth for a clear understanding of the principles of the disclosure. Variations, modifications, and combinations may be made to the above-described embodiments without departing from the scope of the technology. All such variations, modifications, and combinations are included herein by the scope of this disclosure and the following Claims.

What is claimed:

1. A method, for using a plenum to collect debris during the cutting of an object, the plenum comprising a hollow body having a top end having a top opening and a bottom end having a bottom opening, a conduit situated between the top end and the bottom end, bifurcated from and in fluid communication with the hollow body, and a base plate having a machine side, a plenum side, and a base-plate opening, with the plenum side releasably engageable to the top opening, the method comprising:

sealingly attaching the machine side of the base plate onto a stationary portion of a machine spindle nose of a machine;

engaging a cutter to the machine spindle nose wherein the cutter has a base portion and a cutter portion;

engaging the hollow body with the base plate to form an indexable plenum cutter assembly the base portion of the cutter is situated inside the hollow body, at least a portion of the cutter portion is situated outside the hollow body, and there are a body clearing between the hollow body and the cutter and a bottom clearing between the cutter and the bottom opening of the hollow body, and during operation of the machine spindle nose, the plenum does not form contact with the cutter and remains stationary;

cutting the object with the cutter while applying vacuum to the plenum through the conduit, wherein dust or debris generated during the cutting process enters the hollow body through the bottom clearing into the body clearing and into the conduit where it is vacuum removed;

detaching the hollow body from the base plate with the base plate remaining attached to the stationary portion of the machine spindle nose; and replacing the cutter with another cutter.

2. The method of claim 1, wherein:

the cutter is a hollow cutter having a hollow center, a base portion, a cutter portion, a tip opening at a tip of the cutter portion, and a cutter base opening near the base portion wherein the tip opening and the cutter base opening are all in direct fluid, or flow, communication with the hollow center;

when the indexable plenum cutter assembly is formed, the base portion including the cutter base opening of the cutter is situated inside the hollow body and at least a portion of the cutter portion is situated outside the hollow body; and when cutting the object with the hollow cutter, while applying vacuum to the plenum through the conduit, the dust or debris generated during the cutting process enters the hollow body either through the bottom clearing into the body clearing or through the tip opening, along the hollow center, and exits the cutter base opening into the body clearing where the dust and debris enters the conduit and is removed by vacuum.

3. The method of claim 1, further comprising attaching a vacuum hose to the conduit of the plenum and adjusting an orientation of the conduit relative to the machine such that the vacuum hose does not interfere with operation of the machine.

4. The method of claim 1, wherein the base plate is attached to the machine spindle nose through glue, bolt, clamp, fastener, and/or binding.

5. The method of claim 1, wherein the base plate further comprises holes patterned to be engaged with respectively patterned holes or bolts on the stationary portion of the machine spindle nose and the method further comprising attaching the base plate to the stationary portion of the machine spindle nose by bolting through the holes.

6. The method of claim 1, further comprising:

attaching another hollow body to the base plate to form another plenum such that there is a body clearing between the other hollow body and the other cutter; and cutting the same or a different object while applying vacuum to the other plenum to remove debris generated during the cutting process.

7. The method of claim 1, wherein the cutting of the object includes cutting a piece of low density foam.

8. The method of claim 1, wherein the cutting generates unwanted debris from a machinable substrate that should be evacuated from an area proximal to the cutting process.

9. The method of claim 1, wherein the plenum side comprises complementary notches corresponding to shapes of the hollow body where the plenum side engages the hollow body to allow for releasable engagement.

10. The method of claim 1, wherein the base plate comprises holes patterned to engage with respectively patterned features of the stationary portion of the machine spindle nose.

11. The method of claim 1, wherein the hollow body and the base plate are sized and shaped so that the hollow body engages with the base plate at any of multiple angular intervals, thereby allowing the conduit to be moved to any of multiple dispositions.

12. The method of claim 1, wherein the cutter is a solid cutter and the plenum matches the cutter such that the base portion of the cutter is situated inside the hollow body while at least a portion of the cutter portion is situated outside of the hollow body.

13. The method of claim 1, wherein the bottom clearing is approximately 2.5 mm.

14. The method of claim 1, wherein the bottom clearing is at least 5 mm.

* * * * *